United States Patent
Bernadet et al.

(10) Patent No.: US 9,180,625 B2
(45) Date of Patent: Nov. 10, 2015

(54) PROCESS FOR THE PRODUCTION OF A DOUBLE-CURVED PANEL

(75) Inventors: Philippe Bernadet, Colomiers (FR); Laurent Giuseppin, Finhan (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 444 days.

(21) Appl. No.: 13/546,441

(22) Filed: Jul. 11, 2012

(65) Prior Publication Data

US 2013/0015602 A1 Jan. 17, 2013

(30) Foreign Application Priority Data

Jul. 11, 2011 (FR) ..................................... 11 56276

(51) Int. Cl.
| | | |
|---|---|---|
| *B29C 70/44* | (2006.01) | |
| *B29C 70/20* | (2006.01) | |
| *B29B 11/16* | (2006.01) | |
| *B29C 70/22* | (2006.01) | |
| *B29L 31/30* | (2006.01) | |
| *B29C 70/34* | (2006.01) | |

(52) U.S. Cl.
CPC .............. *B29C 70/207* (2013.01); *B29B 11/16* (2013.01); *B29C 70/222* (2013.01); *B29C 70/342* (2013.01); *B29C 70/345* (2013.01); *B29L 2031/3082* (2013.01); *Y02T 50/433* (2013.01)

(58) Field of Classification Search
CPC .... B29B 11/16; B29C 70/207; B29C 70/222; B29C 70/30; B29C 70/34; B29C 70/345; B29C 70/50; B29L 2031/3076; B29L 2031/3082; Y02T 50/433
USPC ............... 264/103, 258, 279, 328.1, DIG. 26, 264/DIG. 75
See application file for complete search history.

(56) References Cited

U.S. PATENT DOCUMENTS

| | | | | |
|---|---|---|---|---|
| 5,082,701 | A | * | 1/1992 | Craven et al. ................ 428/34.5 |
| 5,529,826 | A | * | 6/1996 | Tailor et al. ................... 428/110 |
| 5,766,724 | A | | 6/1998 | Tailor et al. |
| 2011/0086199 | A1 | | 4/2011 | Duqueine et al. |

FOREIGN PATENT DOCUMENTS

EP 2058101 5/2009

OTHER PUBLICATIONS

French search report dated Feb. 10, 2012 in corresponding FR 1156276.

* cited by examiner

*Primary Examiner* — Yogendra Gupta
*Assistant Examiner* — Ninh Le
(74) *Attorney, Agent, or Firm* — Young & Thompson

(57) ABSTRACT

A process for the production of an aircraft panel made of double-curved composite material, with the panel being obtained from a three-dimensional preform that includes fibers that are distributed in a defined arrangement, includes manufacturing a flat fiber preform (22), and deforming the flat preform (22) in such a way as to produce the three-dimensional preform, with the fibers following suitable trajectories at the flat preform in such a way as to obtain the defined arrangement of the fibers after deformation.

18 Claims, 7 Drawing Sheets

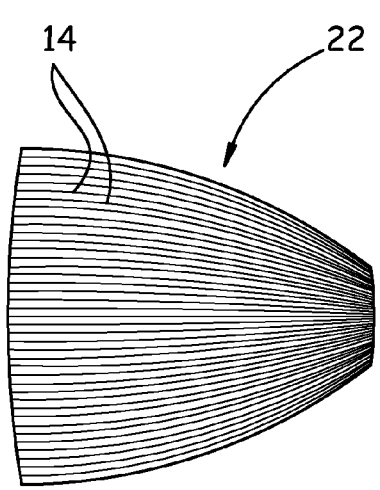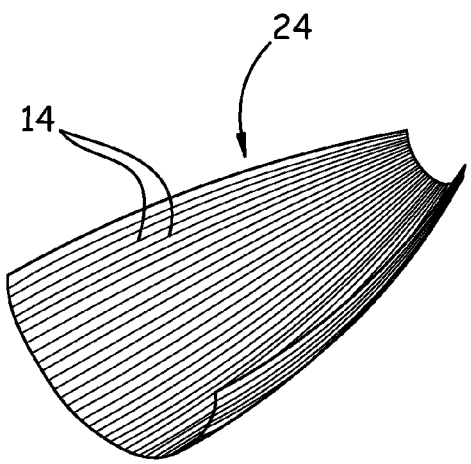
Fig.5A                    Fig.5B
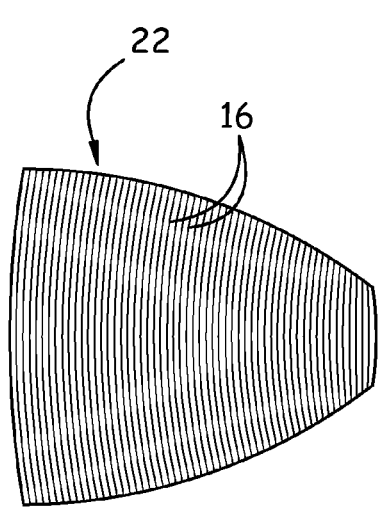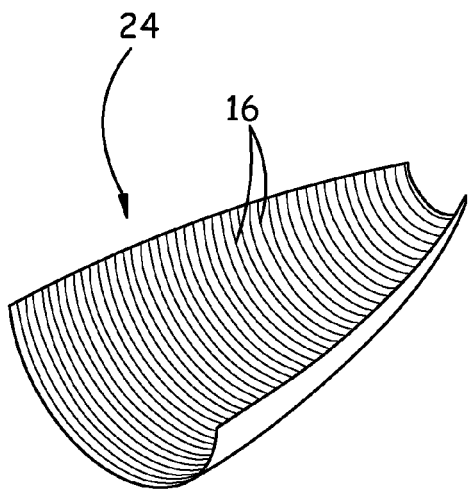
Fig.6A                    Fig.6B

PROCESS FOR THE PRODUCTION OF A DOUBLE-CURVED PANEL

BACKGROUND OF THE INVENTION

This invention relates to a process for the production of a double-curved panel.

DESCRIPTION OF THE RELATED ART

FIGS. 1A and 1B show the front of an aircraft 10 and more particularly a panel 12 that is called a bottom structure that forms a portion of the fuselage and that comprises a double curve. This panel 12 of three-dimensional shape extends over an angular sector of 180° and over a length that can reach 9 m for certain aircraft models, which can represent a surface area on the order of 60 m².

To reduce the on-board weight, this panel 12 is made of composite material from fibers that are oriented in different directions and embedded in a resin matrix.

Hereinafter, longitudinal direction is defined as the direction that extends from the nose to the tail of the aircraft. Longitudinal plane is defined as a plane that contains the longitudinal direction. Transverse plane is defined as a plane that is perpendicular to the longitudinal direction.

To reach an optimal mechanical strength, the fibers are arranged in four series that are oriented in four directions: a first direction at 0°, a second direction at 90°, a third direction at +45°, and a fourth direction at −45°.

As illustrated in FIGS. 2A and 2B, the fibers 14 of the first series that are oriented at 0° should be arranged in such a way that the points of intersection (also called nodes) of these fibers 14 with a perpendicular curve at these points of intersection with the fibers 14 are at an equal distance from one another.

The fibers 16 of the second series that are oriented at 90° should be arranged in such a way that at all nodes, the fibers 16 are perpendicular to the fibers 14.

The fibers 18 of the third series that are oriented at +45° should be arranged in such a way that at all nodes, the fibers 18 are oriented at 45° relative to the fibers 14.

The fibers 20 of the fourth series that are oriented at −45° should be arranged in such a way that at all nodes, the fibers 20 are arranged at −45° relative to the fibers 14.

Consequently, to produce an optimal mechanical strength, the fibers 14, 16, 18 and 20 are not arranged along the geodesic trajectories.

To produce a double-curved panel, it is advisable to produce a mold that has a surface with a three-dimensional shape according to the part to be made and to position the pre-impregnated fibers using at least one deposition head that follows the trajectories of the fibers in such a way as to obtain an arrangement of fibers as described above to produce an optimal mechanical strength.

Following the installation of the fibers, the unit is polymerized by a panel 12. This embodiment requires complex and expensive AFP (for Automatic Fiber Placement)-type robotized means that have an impact on the cost of said panel.

SUMMARY OF THE INVENTION

Also, the purpose of this invention is to remedy the drawbacks of the prior art by proposing a process for the production of a double-curved panel.

For this purpose, the invention has as its object a process for the production of a panel of an aircraft that is made of double-curved composite material, whereby said panel is obtained from a three-dimensional preform that comprises fibers that are distributed in a defined arrangement, characterized in that it consists in manufacturing a flat fiber preform and in deforming said flat preform in such a way as to obtain the three-dimensional preform, with the fibers following suitable trajectories at the flat preform in such a way as to obtain the defined arrangement of fibers after deformation.

BRIEF DESCRIPTION OF THE DRAWING FIGURES

Other characteristics and advantages will emerge from the following description of the invention, a description that is provided only by way of example, relative to the accompanying drawings, in which.

Figure 1A:
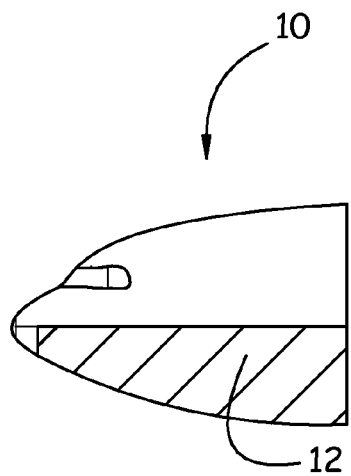
FIG. 1A is a lateral view of the front of an aircraft.
Figure 1B:
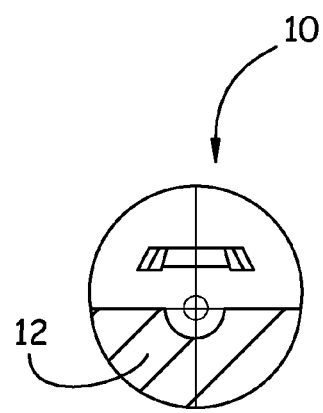
FIG. 1B is a front view of the front of an aircraft.
Figure 2A:
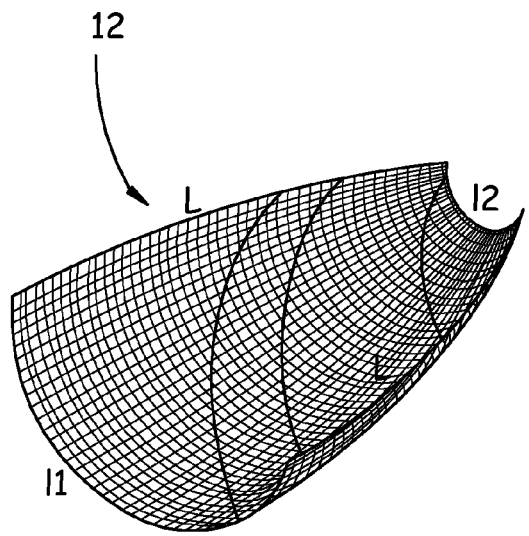
Figure 2B:
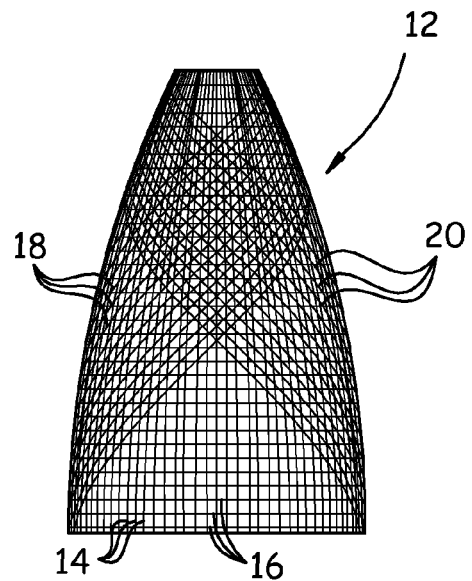
Figure 3:
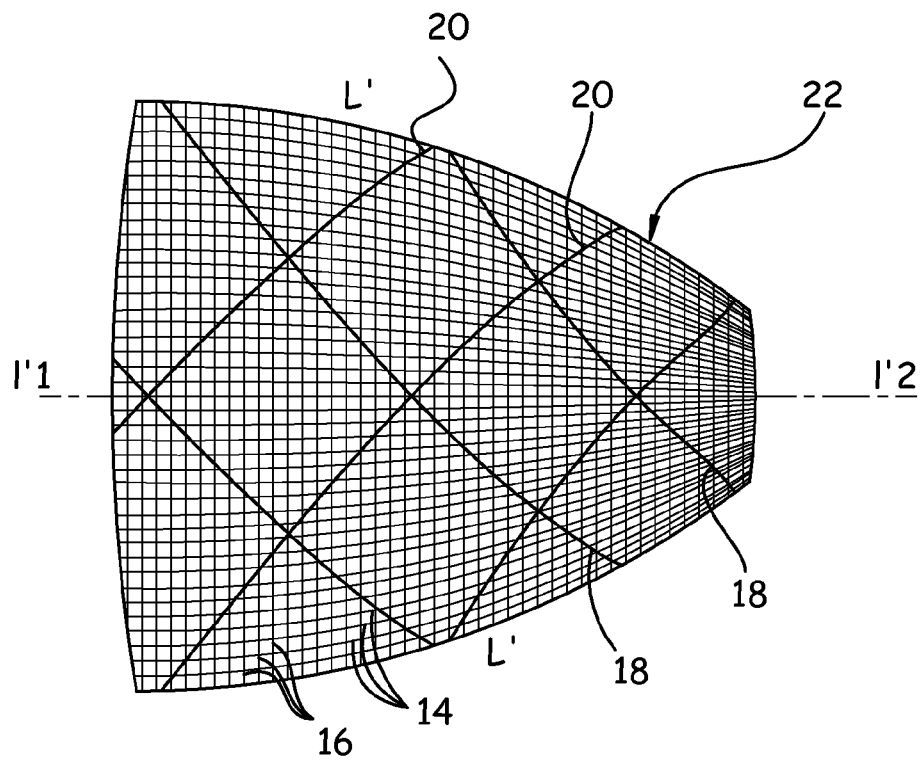
Figure 4:
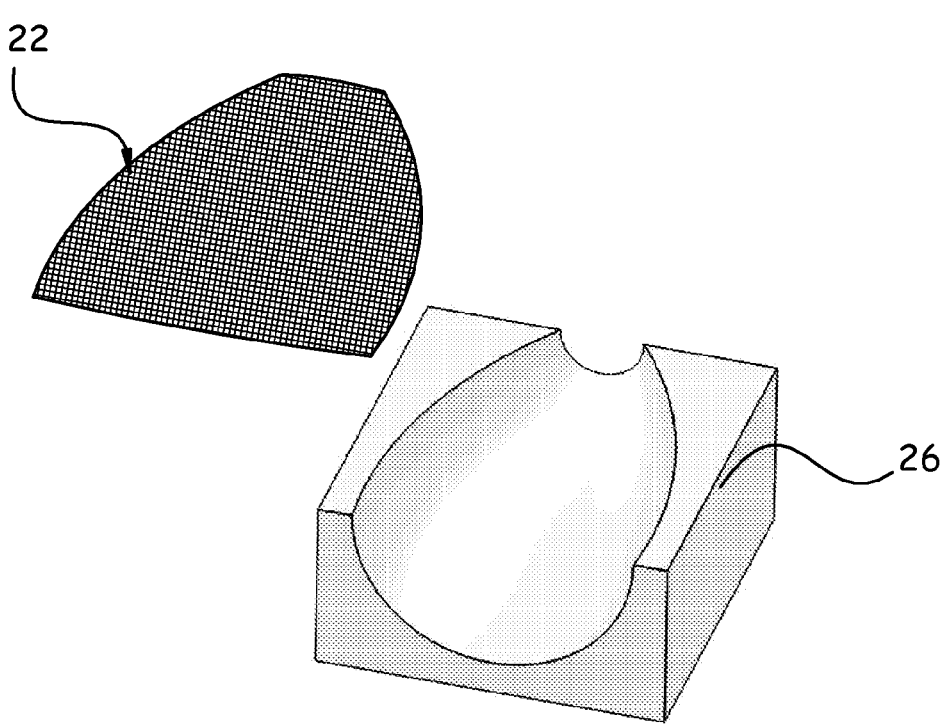
Figures 7A, 7B:
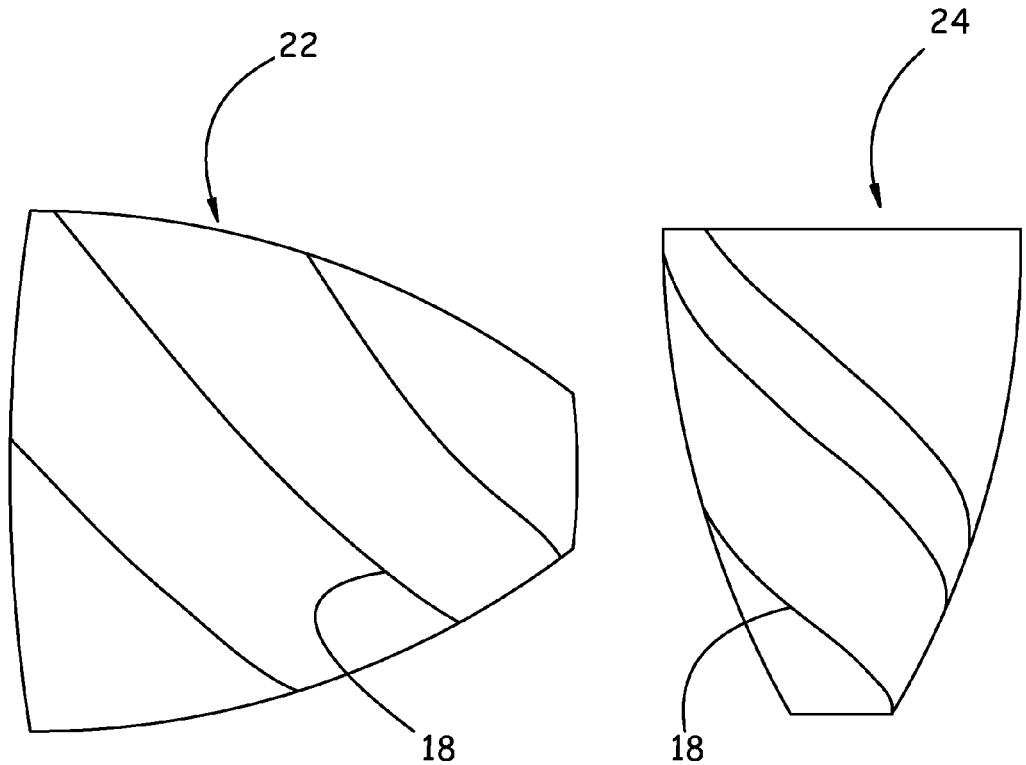
Figure 8:
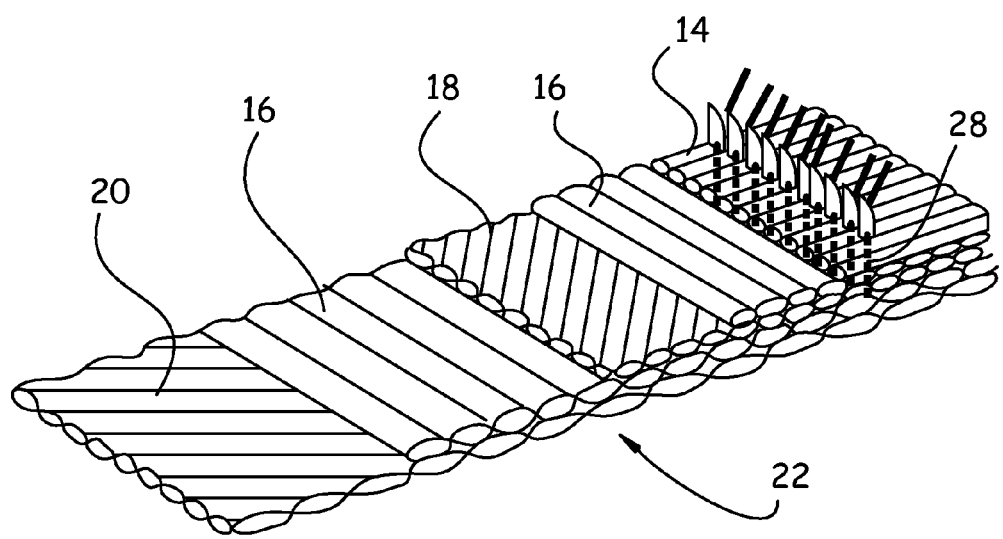
Figure 9:
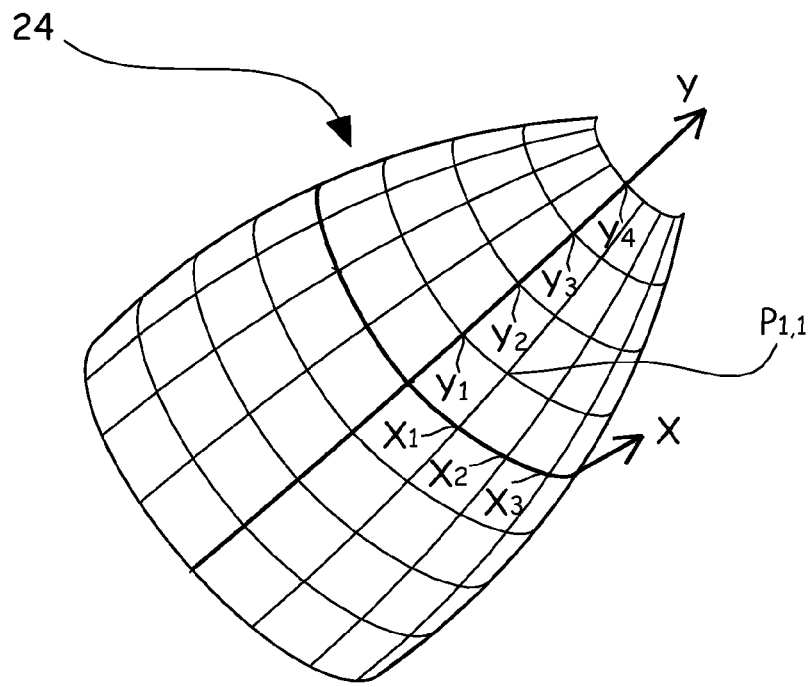
Figure 10:
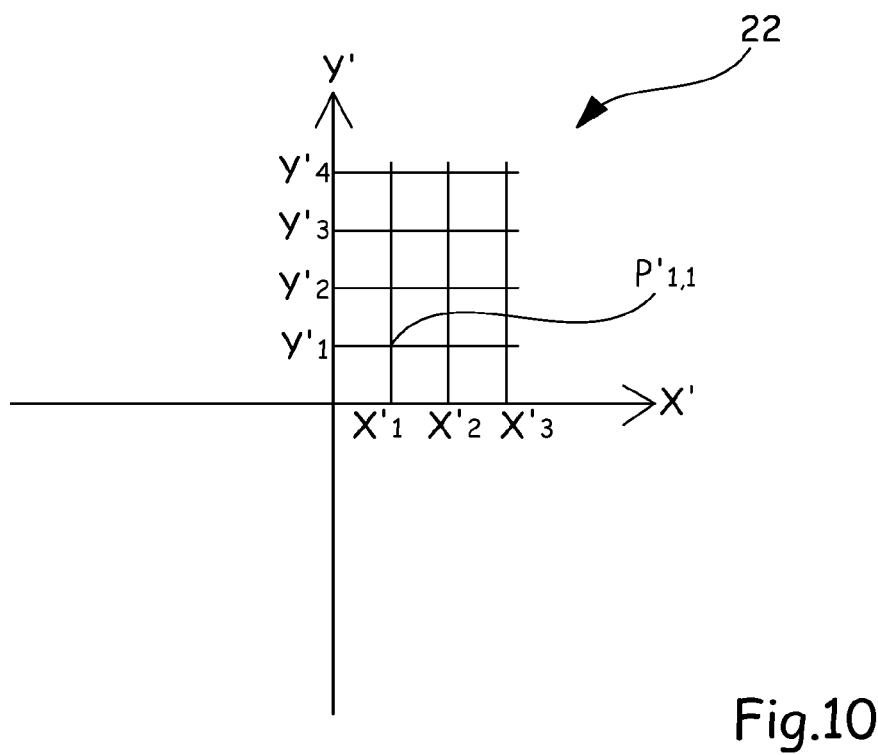
Figure 11:
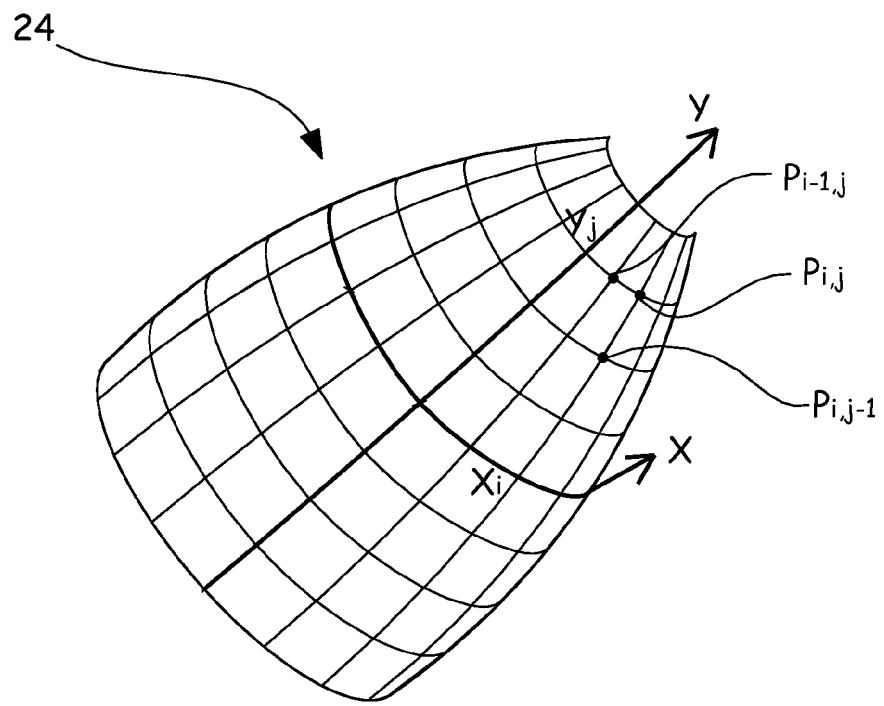
Figure 12:
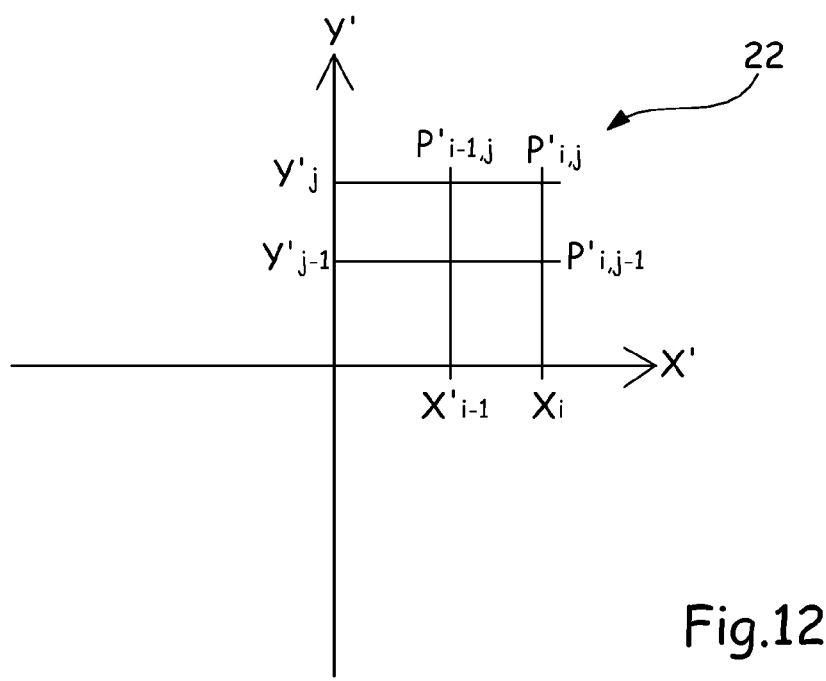
Figure 13:
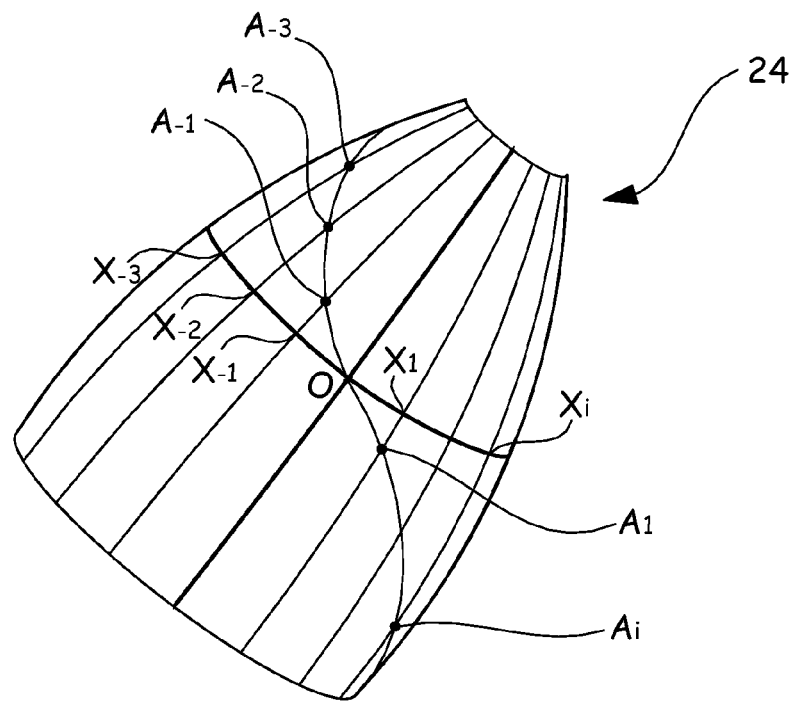
Figure 14:
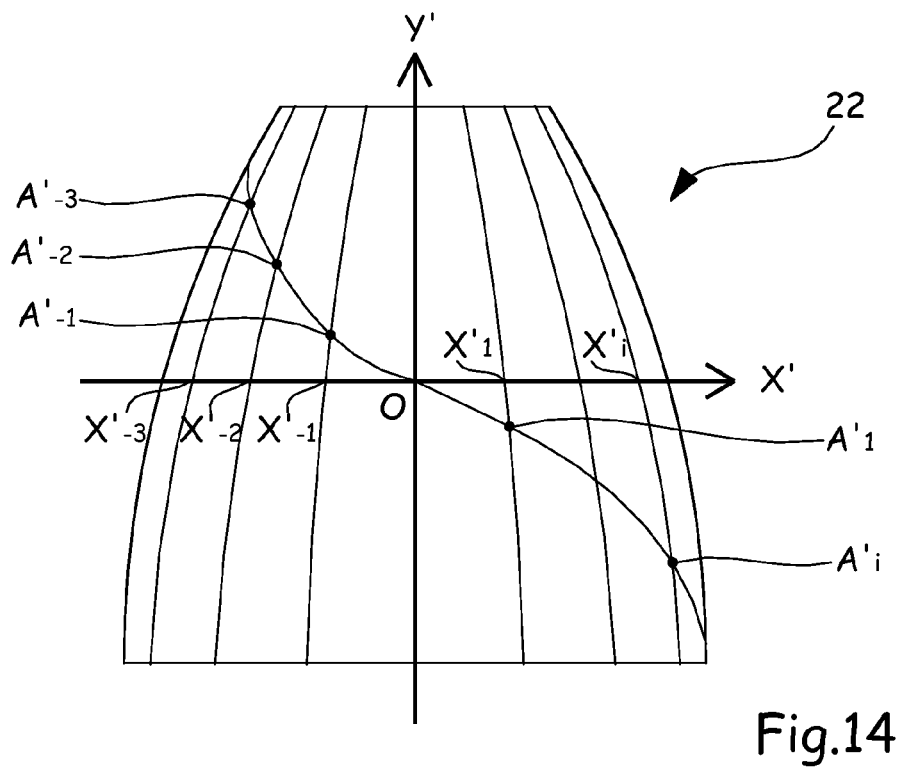

FIG. 2A is a perspective view of a double-curved panel along a first angle of view that illustrates the position of the fibers, FIG. 2B is a perspective view of the panel of FIG. 2A according to another angle of view, FIG. 3 is a top view of a flat panel that makes it possible to obtain the panel that is illustrated in FIG. 2A, FIG. 4 is a perspective view of the flat panel of FIG. 3 before deformation and an example of equipment used for its deformation in such a way as to produce a double-curved panel such as the one that is illustrated in FIG. 2A, FIG. 5A is a top view of a flat panel that illustrates a first series of fibers arranged in the longitudinal direction, FIG. 5B is a perspective view of the panel of FIG. 5A after deformation, FIG. 6A is a top view of a flat panel that illustrates a second series of fibers arranged at 90°, FIG. 6B is a perspective view of the panel of FIG. 6A after deformation, FIG. 7A is a top view of a flat panel that illustrates a second series of fibers arranged at 45°, FIG. 7B is a perspective view of the panel of FIG. 7A after deformation, FIG. 8 is a diagram that illustrates the different orientations of fibers held by sewing, FIG. 9 is a diagram that illustrates a three-dimensional preform on which reference fibers are shown, FIG. 10 is a diagram that illustrates a portion of a flat preform on which the reference fibers are positioned, FIGS. 11 and 12 are diagrams that illustrate the positioning of the points of intersections of fibers at the flat preform from corresponding points of the three-dimensional preform for two series of fibers, and FIGS. 13 and 14 are diagrams that illustrate the positioning of the points of intersections of a fiber of a third series with the fibers of a first series at the flat preform from corresponding points of the three-dimensional preform.

DETAILED DESCRIPTION OF THE INVENTION

At 12, the different figures show a double-curved panel, called a bottom structure, provided at the fuselage in the lower portion of the front of an aircraft.

By way of indication, this panel can have a surface area on the order of 60 m².

However, the invention can apply to other panels of an aircraft having a double curve and a particular arrangement of fibers.

This panel comprises at least two series of fibers, the fibers of the first series being oriented in a first direction, and the fibers of the second series being arranged in a second direction that is different from the first, with the fibers being arranged along non-geodesic trajectories.

According to one embodiment, the panel comprises fibers that are arranged in four series oriented in four directions: a first direction at 0°, a second direction at 90°, a third direction at +45°, and a fourth direction at −45° to produce a mechanical optimum.

The fibers 14 of the first series oriented at 0° should be arranged in such a way that the points of intersections (also called nodes) of these fibers 14 with a perpendicular curve at these points of intersection with the fibers 14 are at an equal distance from one another.

The fibers 16 of the second series that are oriented at 90° should be arranged in such a way that at all nodes, the fibers 16 are perpendicular to the fibers 14.

The fibers 18 of the third series that are oriented at +45° should be arranged in such a way that at all nodes, the fibers 18 are oriented at 45° relative to the fibers 14.

The fibers 20 of the fourth series that are oriented at −45° should be arranged in such a way that at all nodes, the fibers 20 are arranged at −45° relative to the fibers 14.

According to the invention, the process for production consists in manufacturing a flat preform 22 from dry fibers, deforming said flat preform 22 in such a way as to produce a three-dimensional preform 24 whose geometry is identical to that of the panel 12 that is to be produced, and then embedding the dry fibers of the three-dimensional preform 24 in a resin matrix.

The fibers and the resin are not presented in more detail because they are selected by one skilled in the art based on the desired mechanical characteristics of the panel 12.

The last stage of the process can be carried out by using known techniques such as the installation of the dry preform in a rigid mold and the injection of liquid resin in the mold for the RTM (Resin Transfer Molding) or LRI (Liquid Resin Infusion) processes or in a vacuum chamber with a resin film in the case of the RFI (Resin Film Infusion) process or by any other technique.

The three-dimensional preform 24 and the resin undergo a polymerization cycle based on the materials that are used for the fibers and the resin and the desired characteristics of the finished panel 12.

The shaping of the flat preform 22 can be carried out in different ways. According to one embodiment, the flat preform 22 is flattened against a mold whose surface is in accordance with the geometry of one of the surfaces of the finished panel 12. According to the example that is illustrated in FIG. 4, the flat preform 22 is flattened against the surface of a mold 26 whose geometry is in accordance with that of the convex surface of the panel.

As a variant, the flat preform 22 can be arranged between a mold and a counter-mold, with the surface of the mold or counter-mold having a geometry in accordance with that of the convex surface of the panel.

With the fibers being dry (not pre-impregnated with resin), they can slide relative to one another during the transformation of the flat preform 22 into a three-dimensional preform 24.

As illustrated in FIGS. 3, 5A, 6A, 7A, the flat preform 22 is produced by using fibers 14, 16, 18, 20 in a particular arrangement (in directions that are different from those that they will have in the three-dimensional preform) in such a way that said fibers 14, 16, 18, 20 are arranged in the desired directions at the three-dimensional preform after deformation.

The fact of depositing the flat fibers makes it possible to use simpler and less expensive deposition machines and limits the installation time. All of these elements contribute toward reducing the costs of the panel.

According to the illustrated embodiment, the fibers 14, 16, 18, 20 are arranged flat so as to obtain a flat preform 22. The fibers 14, 16, 18, 20 are arranged respectively along first, second, third and fourth trajectories in such a way as to be oriented in the four directions predefined above, at 0°, 90°, +45°, and −45°, and to achieve a mechanical optimum after deformation and shaping of the three-dimensional preform 24.

The flat preform 22 has the same surface area as the three-dimensional preform 24. According to an embodiment, the length L' of the flat preform that corresponds to the length L (parallel to the longitudinal direction) of the three-dimensional preform is greater than the length L, with the elongation percentage (L'−L)/L being equal to 2.5%.

The curve l1' of the flat preform 22 that corresponds to the curve l1 (edge that is downstream from the panel) of the three-dimensional preform 24 is greater than l1, with the elongation percentage (l1'−l1)/l1 being equal to 1.1%.

The curve l2' of the flat preform 22 that corresponds to the curve l2 (edge that is upstream from the panel) of the three-dimensional preform 24 is greater than l2, with the elongation percentage (l2'−l2)/l2 being equal to 1.1%.

The trajectories of the fibers 14, 16, 18, 20 are determined by computer in such a way as to obtain, after deformation, the directions at 0°, 90°, +45° and −45°.

As illustrated in FIG. 5A, the fibers 14 are arranged at the flat preform 22 along a computer-calculated trajectory in such a way that said fibers 14 are arranged in the direction at 0° in the three-dimensional preform 24 as illustrated in FIG. 5B.

As illustrated in FIG. 6A, the fibers 16 are arranged at the flat preform 22 along a computer-calculated trajectory in such a way that said fibers 16 are arranged in the direction at 90° in the three-dimensional preform 24 as illustrated in FIG. 6B.

As illustrated in FIG. 7A, the fibers 18 are arranged at the flat preform 22 along a computer-calculated trajectory in such a way that said fibers 18 are arranged in the direction at +45° in the three-dimensional preform 24 as illustrated in FIG. 7B.

As illustrated in FIG. 8, the flat preform 22 can comprise a series of layers with each of the directions of different fibers.

To allow the sliding of the fibers 16, 18, 20, 22 relative to one another during the deformation all the while keeping the preform stable, it is possible to connect the different layers with at least one piece of sewing 26.

FIGS. 9 to 14 illustrate a process for determining the trajectories of the fibers when flat in such a way as to obtain fibers that are adequately distributed in the three-dimensional preform 24. This process consists in defining—on the three-dimensional preform 24—a first reference with a center O that corresponds to the intersection of the median fiber X of the fibers 16 that are oriented at 90° and the median fiber Y of the fibers 14 that are oriented at 0°, as illustrated in FIG. 9. The fact of providing a center O in the center of the three-dimensional preform 24 makes it possible to limit the distortions as regards the angles. However, other fibers can be used as reference fibers. Thus, the point O is not necessarily centered.

For the sector that is arranged up from the median fiber X and to the right of the median fiber Y, the points of intersection of the fibers 14 with the median fiber X are referenced X1, X2, X3, . . . and the points of intersection of the fibers 16 with the median fiber Y are referenced Y1, Y2, Y3, . . . .

On the three-dimensional preform, for all of the points of intersection, the length of the curve OXi (with i varying from 1 to n, with n being the number of fibers oriented at 0° on one side of the median fiber Y) and the length of the curve OYj (with j varying from 1 to m, with m being the number of fibers oriented at 90° on one side of the median fiber X) are determined.

As illustrated in FIG. 10, on the flat form, the point O' that corresponds to the point O of the three-dimensional preform is positioned at the center. The flat form corresponds to the plane of tangency of the three-dimensional surface at the point O. Two axes X' (abscissa) and Y' (ordinate) that correspond respectively to the median fiber X and the median fiber Y are then positioned. The two axes X' and Y' are perpendicular. The points X'1, X'2, X'3, . . . are positioned on the X' axis and the points Y'1, Y'2, Y'3, . . . are positioned on the Y' axis.

For each point, the distance OX'i is equal to the length of the curve OXi (with i varying from 1 to n), and the distance OY'j is equal to the length of the curve OYj (with j varying from 1 to m).

On the three-dimensional preform, the point P1.1 corresponds to the intersection of the fiber that is oriented at 0° that passes through the point X1 and the fiber that is oriented at 90° that passes through the point Y1. Next, the length of the curve X1P1.1 and the length of the curve Y1P1.1 are determined.

The point P'1.1, whose abscissa is the length of the curve Y1P1.1 and whose ordinate is the length of the curve X1P1.1, is positioned on the flat form.

On the three-dimensional preform, each point Pi,j corresponds to the intersection of the fiber that is oriented at 0° that passes through the point Xi and the fiber that is oriented at 90° that passes through the point Yj, with i varying from 1 to n and with j varying from 1 to m. For each point Pi,j, the length of the portion of the fiber that passes through Yj going from point Pi−1,j to point Pi,j and the length of the portion of the fiber that passes through Xi going from point Pi,j−1 to point Pi,j, as illustrated in FIG. 11, are determined.

On the flat form, the point P'i,j is made to correspond to each point Pi,j. This point P'i,j is positioned from the points P'i−1,j and P'i,j−1, knowing that the distance that separates the points P'i−1,j and P'i,j is equal to the length of the portion of the fiber that passes through Yj going from point Pi−1,j to point Pi,j and that the distance that separates the points P'i,j−1 and P'i,j is equal to the length of the portion of the fiber that passes through Xi from point Pi,j−1 to point Pi,j, as illustrated in FIG. 12.

Having positioned all of the points P'i,j of the upper right quadrant, the procedure for positioning the points P'i,j of the other three quadrants is carried out in the same manner.

Thus, the fiber F1 that is oriented at 0° that passes through the point X1 at the three-dimensional preform passes at the flat form through the points P'1,j with j varying from −m to +m. In the same way, the fiber Fi that is oriented at 0° that passes through the point Xi at the three-dimensional preform passes at the flat form through the points P'i,j with j varying from −m to +m.

In the same way, the fiber Fj that is oriented at 90° that passes through the point Yj at the three-dimensional preform passes at the flat form through the points P'i,j with i varying from −n to +n.

The installation of the fibers in the directions at 0° and at 90° can be carried out in an automated manner with a deposition head that follows the trajectories that are defined by the points P'i,j.

With the fibers that are oriented at 0° and at 90° being positioned on the flat form, it is possible to position the fibers that are oriented at 45° and/or at 135°.

As illustrated in FIGS. 13 and 14, for each of these fibers, the procedure is carried out in the following manner:

In a first step, at the three-dimensional form, the points Ai are positioned with i varying from −n to +n, which correspond to the intersection of the fiber to be positioned with the fibers Fi that are oriented at 0°. For each point Ai, the length of the portion of the fiber Fi that goes from point Xi to point Ai, with Xi being the point of intersection of the fiber Fi that is oriented at 0° with the median fiber X, is determined.

Starting from these lengths, it is possible to determine the position of the points A'i with i varying from −n to +n at the flat form, for each point A'i the length of the fiber Fi on the flat form going from point X'i to point A'i being equal to the length of the curve of the fiber Fi on the three-dimensional preform going from point Xi to point Ai.

Thus, the fiber that passes through the points Ai at the three-dimensional form passes through the points A'i at the flat form.

Instead of using the points Xi for determining the trajectory of the fibers at 45° or at 135°, it is possible to use the points Yj. In this case, at the three-dimensional preform, the points Aj are positioned with j varying from +m to +m, which correspond to the intersection of the fiber that is to be positioned with the fibers Fj that are oriented at 90°. For each point Aj, the length of the portion of the fiber Fj that goes from point Yj to point Aj is determined, with Yj being the point of intersection of the fiber Fj that is oriented at 90° with the median fiber Y.

Starting from these lengths, it is possible to determine the position of the points A'j with j varying from +m to +m at the flat form, for each point A'j the length of the portion of the fiber Fj on the flat form going from point Y'j to point A'j being equal to the length of the portion of the fiber Fj on the three-dimensional preform going from point Yj to point Aj.

Thus, the fiber that passes through the points Aj at the three-dimensional preform passes through the points A'j at the flat form.

The invention claimed is:

1. Process for the production of a panel of an aircraft that is made of double-curved composite material, said panel comprising fibers (14, 16, 18, 20) following a predefined final set of trajectories that comprises at least two series of fibers, the fibers of a first series being oriented at 0° and the fibers of a second series being oriented at 90°, the process comprising the step of: manufacturing a flat fiber preform (22) with dry fibers that follow a predefined first set of trajectories for use to obtain a three-dimensional preform (24) with fibers following the predefined final set of trajectories after deformation, said predefined first set of trajectories comprising at least: i) a first series of fibers that correspond to the first series of the final set of trajectories after deformation, said first series of fibers following curved trajectories that are different from the trajectories of the first series of the final set of trajectories, and ii) a second series of fibers that correspond to the second series of the final set of trajectories after deformation, said second series of fibers following curved trajectories that are different from the trajectories of the second series of the final set of trajectories; iii) wherein said first set of trajectories are calculated by a computer to account for positions of said final set of trajectories; and deforming said flat preform (22) in both a longitudinal plane along a longitudinal direction of the flat preform and a transverse plane perpendicular to the longitudinal direction such that the dry fibers move relative to one another during deformation to change from a distribution of the fibers in the first set of trajectories to the final set of trajectories so as to obtain the three-dimensional preform (24), with the fibers (14, 16, 18, 20) following the predefined final set of trajectories; embedding the three-dimensional preform in a resin matrix; and polymerizing the three-dimensional preform embedded in the resin matrix to obtain the panel.

2. Process for the production of an aircraft panel made of double-curved composite material according to claim 1, wherein the first and second series of fibers of the flat preform (22) slide relative to one another during the deformation step.

3. Process for the production of an aircraft panel made of double-curved composite material according to claim 1, wherein the flat preform (22) is flattened against a surface of a mold (26) whose geometry is in accordance with that of a convex surface of the panel.

4. Process for the production of an aircraft panel made of a double-curved composite material according to claim 1, wherein the flat preform (22) is inserted between a mold and a counter-mold to deform the flat perform (22).

5. Process for the production of an aircraft panel made of a double-curved composite material according to claim 1, wherein in said step of manufacturing a flat fiber preform (22), the predefined first set of trajectories where the first series of fibers are located on the flat preform is determined by:
  i) determining points $P_{i,j}$ that correspond to an intersection of a fiber ($F_i$) of the first series of fibers with a fiber ($F_j$) of the second series of fibers in the three-dimensional preform,
  ii) measuring for each point $P_{i,j}$, a length of a portion of the fiber ($F_i$) of the first series of fibers going from a point $P_{i,j}$ to a point $P_{i-1,j}$, and a length of a portion of the fiber ($F_j$) of the second series of fibers going from the point $P_{i,j}$ to the point $P_{i,j-1}$ and
  iii) identifying points $P'_{i,j}$ at the flat preform that corresponds respectively to the point $P_{i,j}$ of the three-dimensional preform starting from initial points $P'_{i-1,j}$ and $P'_{i,j-1}$, knowing that the distance that separates the points $P'_{i-1,j}$ and $P'_{i,j}$ is equal to the length of the portion of the fiber going from point $P_{i-1,j}$ to point $P_{i,j}$ and that the distance that separates the points $P'_{i,j-1}$ and $P'_{i,j}$ is equal to the length of the portion of the fiber from point $P_{i,j-1}$ to point $P_{i,j}$, and
  wherein in the step of manufacturing the flat fiber preform (22) with fibers (14, 16, 18, 20) following the predefined first set of trajectories, a first layer of the first series of fibers are placed along the curved trajectories of the first series of fibers, and a second layer of the second series of fibers are placed along the curved trajectories of the second series of fibers, using the identified points $P'_{i,j}$ as intersection points for the first and second layers of fibers.

6. Process for the production of an aircraft panel made of a double-curved composite material according to claim 5, further comprising selecting for each of the first and second series of fibers, a reference fiber (X, Y) that corresponds respectively i) to a fiber that contains points $P_{i,0}$ on the reference fiber of the first series of fibers and ii) to a fiber that contains points $P_{0,j}$ on the reference fiber of the second series of fibers, and iii) positioning the points $P'_{i,j}$ starting from the points of each reference fiber (X, Y).

7. Process for the production of an aircraft panel made of a double-curved composite material according to claim 6, wherein the reference fibers are median fibers of each series of fibers.

8. Process for the production of an aircraft panel made of a double-curved composite material according to claim 6, wherein after having placed the at least two series of fibers at the flat preform (22), placing a third series of fibers on the flat perform (22), including, for each fiber of the third series of fibers that are to be secant with the fibers of the first series of fibers:
  i) identifying, at a three-dimensional form corresponding to the three-dimensional preform (24), points $A_i$ that correspond to an intersection of the fiber of the third series of fibers that is to be positioned with the fibers of the first series,
  ii) determining for each point $A_i$ a length of a portion of the fiber of the first series going from point $A_i$ up to the reference fiber of the second series,
  iii) determining a position of the points $A'_i$ at the flat preform (22) corresponding to the points $A_i$ at the three-dimensional form, with for each point $A'_i$, the length of the fiber of the first series at the flat preform going from point $A'_i$ up to the reference fiber of the second series being equal to the length of the portion of the fiber of the first series at the three-dimensional preform going from point $A_i$ up to the reference fiber of the second series.

9. Process for the production of an aircraft panel made of double-curved composite material according to claim 2, wherein the flat preform (22) is flattened against a surface of a mold (26) whose geometry is in accordance with that of a convex surface of the panel.

10. Process for the production of an aircraft panel made of a double-curved composite material according to claim 2, wherein the flat preform (22) is inserted between a mold and a counter-mold to deform it.

11. Process for the production of an aircraft panel made of a double-curved composite material according to claim 1, wherein the flat preform has the same surface area as the three-dimensional preform.

12. Process for the production of an aircraft panel made of a double-curved composite material according to claim 1, wherein an edge of the flat perform, that corresponds to an edge of the three dimensional preform parallel to the longitudinal direction, is greater than the correspondent edge of the three dimensional preform after deformation.

13. Process for the production of an aircraft panel made of a double-curved composite material according to claim 11, wherein an edge of the flat perform, that corresponds to an edge of the three dimensional preform parallel to the longitudinal direction, is greater than the correspondent edge of the three dimensional preform after deformation.

14. Process for the production of an aircraft panel made of a double-curved composite material according to claim 1, wherein an edge of the flat perform, that corresponds to an edge of the three dimensional preform perpendicular to the longitudinal direction, is greater than the correspondent edge of the three dimensional preform after deformation.

15. Process for the production of an aircraft panel made of a double-curved composite material according to claim 11, wherein an edge of the flat perform, that corresponds to an edge of the three dimensional preform perpendicular to the longitudinal direction, is greater than the correspondent edge of the three dimensional preform after deformation.

16. Process for the production of an aircraft panel made of a double-curved composite material according to claim 12, wherein an edge of the flat perform, that corresponds to an edge of the three dimensional preform perpendicular to the longitudinal direction, is greater than the correspondent edge of the three dimensional preform after deformation.

17. Process for the production of an aircraft panel made of a double-curved composite material according to claim 13, wherein an edge of the flat perform, that corresponds to an edge of the three dimensional preform perpendicular to the longitudinal direction, is greater than the correspondent edge of the three dimensional preform after deformation.

18. Process for the production of an aircraft panel made of a double-curved composite material according to claim 1, wherein the flat preform comprises a series of layers, the fibers orientation being different for each layer.

* * * * *